United States Patent
Shibata

(10) Patent No.: US 12,027,666 B2
(45) Date of Patent: Jul. 2, 2024

(54) ELECTROLYTE COMPOSITION, ELECTROLYTE FILM, AND METHOD OF MANUFACTURING ELECTROLYTE FILM

(71) Applicant: NIPPON SHOKUBAI CO., LTD., Osaka (JP)

(72) Inventor: Shin-ya Shibata, Suita (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 697 days.

(21) Appl. No.: 17/264,839

(22) PCT Filed: Jul. 5, 2019

(86) PCT No.: PCT/JP2019/026822
§ 371 (c)(1),
(2) Date: Jan. 31, 2021

(87) PCT Pub. No.: WO2020/026702
PCT Pub. Date: Feb. 6, 2020

(65) Prior Publication Data
US 2021/0296700 A1 Sep. 23, 2021

(30) Foreign Application Priority Data

Jul. 31, 2018 (JP) ................................. 2018-144258
May 9, 2019 (JP) ................................. 2019-089011

(51) Int. Cl.
*H01M 10/05* (2010.01)
*H01M 10/0565* (2010.01)

(52) U.S. Cl.
CPC .................. *H01M 10/0565* (2013.01); *H01M 2300/0082* (2013.01)

(58) Field of Classification Search
None
See application file for complete search history.

(56) References Cited

U.S. PATENT DOCUMENTS

2007/0119460 A1 5/2007 Brain
2012/0202123 A1 8/2012 Jeon et al.
(Continued)

FOREIGN PATENT DOCUMENTS

CN 105336981 A 2/2016
CN 106602138 A 4/2017
(Continued)

OTHER PUBLICATIONS

Echeverri, M. et al., Highly conductive completely amorphous polymer electrolyte membranes fabricated through photopolymerization of poly (ethylene glycol diacrylate) in mixtures of solid plasticizer and lithium salt, Dec. 10, 2013, Solid State Ionics, vol. 254, pp. 92-100. (Year: 2013).*

(Continued)

*Primary Examiner* — Maria Laios
*Assistant Examiner* — Angela J Martin
(74) *Attorney, Agent, or Firm* — Maschoff Brennan

(57) ABSTRACT

The present invention aims to provide an electrolyte composition from which an electrolyte film having a higher battery performance than typical electrolyte films is obtained. The present invention provides an electrolyte composition containing an alkali metal salt. The composition further contains a photocurable and/or thermosetting monomer; and a salt dissociating agent. A content ratio of the alkali metal salt is 50% by mass or more relative to 100% by mass of the total amount of the alkali metal salt, the photocurable and/or thermosetting monomer, and the salt dissociating agent.

14 Claims, 1 Drawing Sheet

(56) References Cited

U.S. PATENT DOCUMENTS

| | | |
|---|---|---|
| 2012/0244427 A1 | 9/2012 | Hashimoto et al. |
| 2014/0227611 A1 | 8/2014 | Nakamura |
| 2016/0028110 A1 | 1/2016 | Yu et al. |
| 2018/0123172 A1* | 5/2018 | Katsuyama ............... H01B 1/20 |
| 2019/0135632 A1* | 5/2019 | Yamada ................... H01M 8/10 |

FOREIGN PATENT DOCUMENTS

| | | | |
|---|---|---|---|
| CN | 107492680 A | 12/2017 | |
| EP | 2355213 A2 | 8/2011 | |
| EP | 3648226 A1 | 5/2020 | |
| JP | 2008-218237 A | 9/2008 | |
| JP | WO2007-119460 A1 | 8/2009 | |
| JP | 2011-142073 A | 7/2011 | |
| JP | 2012-54071 A | 3/2012 | |
| JP | 2012-505514 A | 3/2012 | |
| JP | 2012054071 * | 3/2012 | ............ Y02E 60/10 |
| JP | 2015-168754 A | 9/2015 | |
| JP | 2015-537352 A | 12/2015 | |
| JP | 2019-009043 A | 1/2019 | |
| WO | 2013/042503 A1 | 3/2013 | |

OTHER PUBLICATIONS

Echeverri, M. et al., Highly conductive, completely amorphous polymer electrolyte membranes fabricated through photo-polymerization of poly(ethylene glycol) diacrylate) in mixtures of solid plasticizer and lithium salt, Solid State Ionics, vol. 254, pp. 92-100 (Dec. 10, 2013).

* cited by examiner

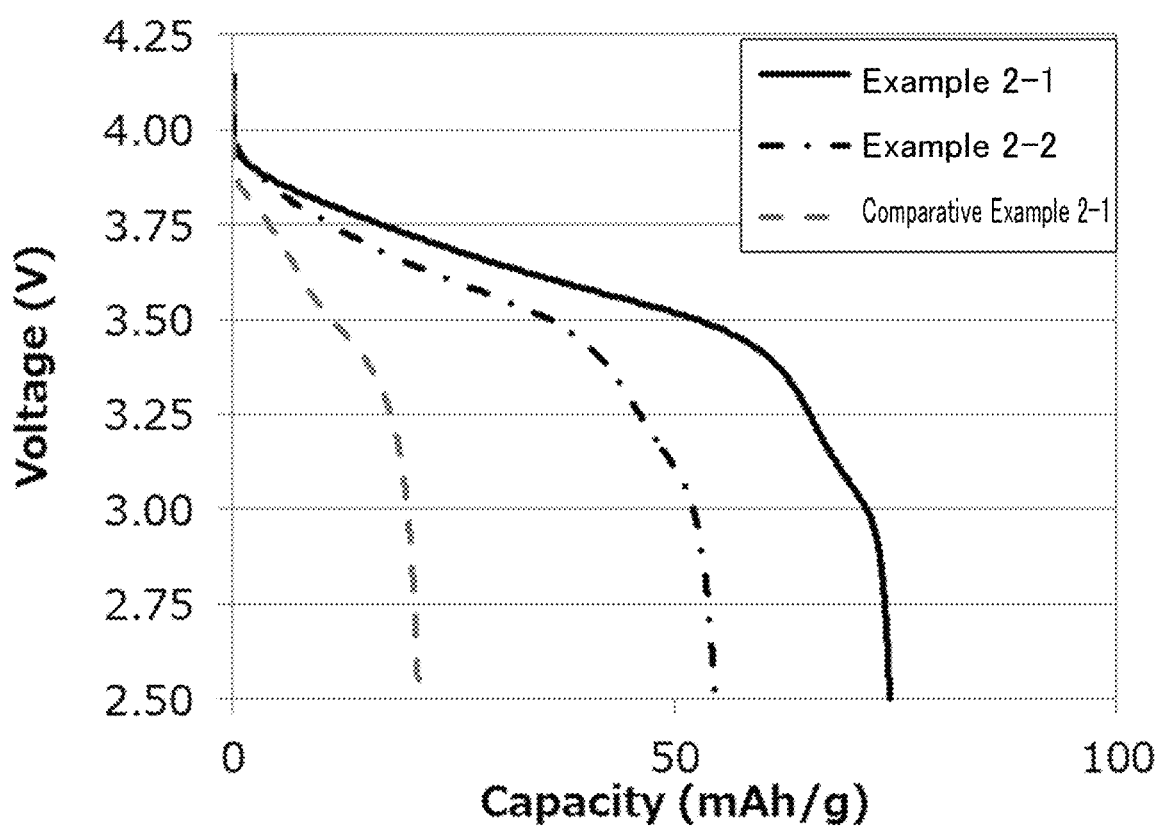

ELECTROLYTE COMPOSITION, ELECTROLYTE FILM, AND METHOD OF MANUFACTURING ELECTROLYTE FILM

TECHNICAL FIELD

The present invention relates to an electrolyte composition, an electrolyte film (electrolyte membrane), and a method of manufacturing the electrolyte film. More specifically, the present invention relates to an electrolyte composition suitably used as a material of batteries such as lithium ion batteries, an electrolyte film containing the electrolyte composition, and a method of manufacturing the electrolyte film.

BACKGROUND ART

In recent years, with an increasing concern for environmental problems, energy resources are shifting from fossil fuels such as petroleum and coal to alternatives. Accordingly, importance of and demand for batteries are increasingly expected. Out of the batteries, repeatedly chargeable/dischargeable secondary batteries have been used in various fields such as automobiles and aircrafts, as well as electronic devices such as mobile phones and laptop computers. Various secondary batteries and materials of the secondary batteries are thus researched and developed. In particular, lithium ion batteries with large capacities and lower weights are the secondary batteries whose extensive use is most expected in the future and which are thus most actively researched and developed.

In the research and development of such batteries, techniques are developed to improve ion conductivities of electrolytes used in all-solid-state batteries. For example, Patent Document 1 discloses a solid electrolyte composition containing a cross-linking group-containing polyether polymer, an electrolyte salt compound, and, as a photopolymerization initiator, a compound represented by a predetermined structure. Patent Document 2 discloses a polymer solid electrolyte containing a polymer of a carbonate group-containing (meth)acrylic acid ester monomer represented by a predetermined structure and with a molecular weight of 300 or less, and an electrolyte salt. Patent Document 3 discloses an electrolyte material containing, as essential components, a polymer having an ether bond in a side chain, and an electrolyte salt. The polymer includes a polymer obtained from a monomer component containing a monomer represented by a predetermined structure. The electrolyte salt includes an ionic compound containing alkali metal cations and at least one kind of anions selected from the group consisting of $R^1SO_2N$—$SO_2R^4$ (where $R^3$ and $R^4$ are identical to or different from each other and each represent F, $CF_3$, or $C_2F_5$), $PF_6^-$, $BF_4^-$, $CF_3SO_3^-$ and tetracyanoborate.

CITATION LIST

Patent Documents

Patent Document 1: International Publication No. 2007/119460.

Patent Document 2: Japanese Unexamined Patent Publication No. 2008-218237

Patent Document 3: Japanese Unexamined Patent Publication No. 2011-142073

SUMMARY OF THE INVENTION

Technical Problem

As described above, for example, various electrolyte compositions have been developed. However, electrolyte films made from the typical electrolyte compositions exhibit insufficient battery performances.

The present invention was made under the circumstances described above. It is an objective of the present invention to provide an electrolyte composition from which an electrolyte film having a higher battery performance than the typical electrolyte film is obtained. It is another objective of the present invention to provide an electrolyte film made from the electrolyte composition, and a method of manufacturing the electrolyte film.

Solution to the Problem

The present inventor has found the following after variously studying electrolyte compositions. An electrolyte film made from a composition containing predetermined amounts of an alkali metal salt, a photocurable and/or thermosetting monomer, and a salt dissociating agent exhibits a higher battery performance than typical electrolyte films. Specifically, the present inventor has found the following. An electrolyte film made from a composition containing the components described above has a greater alkali metal ion transport number, and an excellent ion conductivity even when a load is applied to the film by increasing the current to be applied in a current conduction test. Batteries assembling the electrolyte film have excellent discharge voltages and discharge capacities. The present inventor has also found that an electrolyte film can be formed from a composition containing the components described above without using any solvent. In this manner, the present inventor has been conceived of the solution to the problem described above and arrived at the present invention.

Specifically, the present invention is directed to an electrolyte composition containing an alkali metal salt. The composition further contains a photocurable and/or thermosetting monomer; and a salt dissociating agent. A content ratio of the alkali metal salt is 50% by mass or more relative to 100% by mass of a total amount of the alkali metal salt, the photocurable and/or thermosetting monomer, and the salt dissociating agent.

In one preferred embodiment, the alkali metal salt is represented by the following formula (1):

$$MN(SO_2R^1)(SO_2R^2) \tag{1}$$

(where M represents an alkali metal ion, and $R^1$ and $R^2$ are identical to or different from each other and each represent a fluorine atom or a fluoroalkyl group with a carbon number of 1 to 3).

The alkali metal salt is of an alkali metal salt of bis(fluorosulfonyl)imide in one preferred embodiment.

The photocurable and/or thermosetting monomer has a hetero element in one preferred embodiment.

The photocurable and/or thermosetting monomer may be of one or more kinds, and contains a polyfunctional monomer in one preferred embodiment.

The salt dissociating agent is a sulfonyl compound in one preferred embodiment.

The salt dissociating agent is a carbonate compound in one preferred embodiment.

The salt dissociating agent is a nitrile compound in one preferred embodiment.

The electrolyte composition further contains a polymerization initiator in one preferred embodiment.

The present invention is also directed to an electrolyte film obtained by curing the electrolyte composition. The electrolyte film contains: an alkali metal salt; a polymer having a structural unit derived from a photocurable and/or thermosetting monomer, and a salt dissociating agent.

The electrolyte film may further contain: an organic solvent with a lower boiling point than the salt dissociating agent. A content of the organic solvent is preferably 20% by mass or less relative to 100% by mass of a total amount of the alkali metal salt, the polymer having the structural unit derived from the photocurable and/or thermosetting monomer, and the salt dissociating agent.

The present invention is further directed to a method of manufacturing an electrolyte film. The method includes: a step of curing the electrolyte composition. An amount of the organic solvent with a lower boiling point than the salt dissociating agent used in the step of curing is 20% by mass or less relative to 100% by mass of the total amount of the alkali metal salt, the photocurable and/or thermosetting monomer, and the salt dissociating agent in the composition.

Advantage of the Invention

The electrolyte composition according to the present invention has the configuration described above, and an electrolyte film obtained therefrom has a higher battery performance than typical electrolyte films and thus can be suitably used as a material of batteries such as lithium ion batteries.

BRIEF DESCRIPTION OF THE DRAWING

FIG. 1 shows discharge curves indicating results of charge and discharge tests using coin-type lithium ion secondary batteries prepared in Examples 2-1 and 2-2 and Comparative Example 2-1.

DESCRIPTION OF EMBODIMENT

A preferred embodiment of the present invention will be described in detail below. The present invention is however not only limited to the following description. Various changes can be made in the present invention without departing from the gist of the present invention. Note that embodiments obtained by combining two or more individual preferred embodiments described below also correspond to a preferred embodiment of the present invention.

[Electrolyte Composition]

An electrolyte composition according to the present invention contains an alkali metal salt, a photocurable and/or thermosetting monomer, and a salt dissociating agent. A content ratio of the alkali metal salt is 50% by mass or more relative to 100% by mass of a total amount of the alkali metal salt, the photocurable and/or thermosetting monomer, and the salt dissociating agent. Since the composition contains these components, an electrolyte film obtained therefrom has a high battery performance. In addition, the use of the composition allows the film to be formed without any solvent. In addition, since the composition contains the photocurable and/or thermosetting monomer, the monomer is polymerized when the composition is cured to obtain the electrolyte film. Accordingly, the electrolyte film obtained has excellent mechanical strength and self-supporting properties.

The content ratio of the alkali metal salt in the composition is not particularly limited. The content ratio of the alkali metal salt is preferably 50% by mass or more relative to 100% by mass of the total amount of the alkali metal salt, the photocurable and/or thermosetting monomer, and the salt dissociating agent. Accordingly, the electrolyte film obtained has a further improved ion conductivity. It is difficult to increase the concentration of the alkali metal salt in typical electrolyte compositions in view of film-forming properties. By contrast, in the present invention, the composition containing the alkali metal salt, the photocurable and/or thermosetting monomer, and the salt dissociating agent sufficiently reduces a decrease in the film-forming properties and further improves the ion conductivity, even if the composition contains the alkali metal salt at a high concentration. In addition, at a high concentration of the alkali metal salt, the conduction path formed by anions is believed to be largely involved in the conductivity of the alkali metal ions. Thus, the feature that the composition contains the salt dissociating agent to dissociate the alkali metal ions and the anions in the composition has a particular technical significance. The content ratio of the alkali metal salt is more preferably 52% by mass or more, furthermore preferably 54% by mass or more, still more preferably 56% by mass or more, particularly preferably 58% by mass or more. On the other hand, the content ratio of the alkali metal salt is preferably 98% by mass or less, more preferably 95% by mass or less, furthermore preferably 90% by mass or less, particularly preferably 88% by mass or less.

The content of the photocurable and/or thermosetting monomer in the electrolyte composition is not particularly limited. The content the photocurable and/or thermosetting monomer is preferably 10% by mass to 45% by mass relative to 100% by mass of the total amount of the alkali metal salt, the photocurable and/or thermosetting monomer, and the salt dissociating agent. Accordingly, even at a high concentration of the alkali metal salt, the polymerization reaction proceeds sufficiently, which provides an electrolyte film with a more excellent mechanical strength. The content of the photocurable and/or thermosetting monomer is more preferably 13% by mass to 43% by mass, particularly preferably 15% by mass to 40% by mass. Depending on the contents of the alkali metal salt, the salt dissociating agent, the polymerization initiator, and the other components, the content of the photocurable and/or thermosetting monomer is more preferably 18% by mass to 38% by mass. If the electrolyte composition contains two or more kinds of photocurable and/or thermosetting monomers, the content of the monomers represents the total amount of the two or more kinds of the monomers.

The content of the salt dissociating agent in the electrolyte composition is not particularly limited. The content of the salt dissociating agent is preferably 0.5% by mass to 30% by mass relative to 100% by mass of the total amount of the alkali metal salt, the photocurable and/or thermosetting monomer, and the salt dissociating agent. Accordingly, even at a high concentration of the alkali metal salt, the ions are sufficiently dissociated and the ion conductivity further improves. The content is more preferably 1% by mass to 28% by mass, furthermore preferably 2% by mass to 26% by mass, still more preferably 5% by mass to 25% by mass, yet more preferably 8% by mass to 20% by mass, particularly preferably 10% by mass to 20% by mass. Depending on the contents of the alkali metal salt, the photocurable and/or thermosetting monomer, the polymerization initiator, and the other components, the content of the salt dissociating agent may be 15% by mass or less, 12% by mass or less, or 10% by mass or less.

The electrolyte composition further contains a polymerization initiator in one preferred embodiment. This allows sufficient curing when obtaining the electrolyte film from the electrolyte composition. The content of the polymerization initiator in the electrolyte composition is not particularly limited. The content of the polymerization initiator is preferably 0.1% by mass or more relative to 100% by mass of the photocurable and/or thermosetting monomer. The content is more preferably 0.2% by mass or more, furthermore preferably 0.5% by mass or more. On the other hand, the content of the polymerization initiator is preferably 10% by mass or less, more preferably 9% by mass or less, furthermore preferably 8% by mass or less, particularly preferably 5% by mass or less. The polymerization initiator at a content of 0.1% by mass to 10% by mass sufficiently reduces a deterioration of the characteristics of the electrolyte film, and increases the strength of the film.

The electrolyte composition may contain other components besides the alkali metal salt, the photocurable and/or thermosetting monomer, the salt dissociating agent, and the polymerization initiator.

In one preferred embodiment, the content of the other components is 0% by mass to 30% by mass relative to 100% by mass of the total amount of the alkali metal salt, the photocurable and/or thermosetting monomer, and the salt dissociating agent. The content is more preferably 0% by mass to 25% by mass, furthermore preferably 0% by mass to 15% by mass.

The essential and optional components contained in the electrolyte composition according to the present invention will be further described below.

<Alkali Metal Salt>

The alkali metal salt is not particularly limited. Examples of the alkali metal constituting the alkali metal salt include lithium, sodium, potassium, rubidium, cesium, and francium. The alkali metal is preferably lithium, sodium, or potassium, more preferably lithium.

Examples of the alkali metal salt include: an alkali metal salt of a fluorosulfonic acid such as $LiFSO_3$; an alkali metal salt of a trifluoromethane sulfonic acid such as $LiCF_3SO_3$; an imide-based alkali metal salt such as $LiN(FSO_2)_2$; an alkali metal salt of perfluoroalkanesulfonylmethide such as $LiC(CF_3SO_2)_3$; a fluorophosphate such as $LiPF_a(C_mF_{2m+1})_{6-a}$ (where $0 \leq a \leq 6$ and $1 \leq m \leq 2$); alkali metal perchlorate such as $LiClO_4$; a fluoroborate such as $LiBF_b(C_nF_{2n+1})_{4-b}$ (where $0 \leq b \leq 4$ and $1 \leq n \leq 2$); an alkali metal salt of an oxalatoborate such as LiBOB; a cyanoborate such as lithium tetracyanoborate; and alkali metal salts such as $LiAsF_6$, LiI, and $LiSbF_6$.

Among these, the alkali metal salt is preferably the imide-based alkali metal salt such as $LiN(FSO_2)_2$, more preferably a compound represented by:

$$MN(SO_2R^1)(SO_2R^2) \quad (1)$$

(where M represents the alkali metal ion, and $R^1$ and $R^2$ are identical to or different from each other and each represent a fluorine atom or a fluoroalkyl group with a carbon number of 1 to 3).

The alkali metal in the M is as described above.

The fluoroalkyl group with a carbon number of 1 to 3 for each of the $R^1$ and $R^2$ described above may be obtained by replacing, with a fluorine atom, at least one of hydrogen atoms contained in a hydrocarbon group with a carbon number of 1 to 3. Specifically, examples of the fluoroalkyl group include a fluoromethyl group, a difluoromethyl group, a trifluoromethyl group, a fluoroethyl group, a difluoroethyl group, a trifluoroethyl group, and a pentafluoroethyl group. Each of the $R^1$ and $R^2$ is preferably a fluorine atom, a trifluoromethyl group and a pentafluoroethyl group, more preferably a fluorine atom and a trifluoromethyl group, most preferably a fluorine atom.

Out of the compounds represented by the formula (1) described above, it is preferably the alkali metal salts of a bis(fluorosulfonyl)imide and a bis(trifluoromethanesulphonyl)imide, more preferably $LiN(FSO_2)_2$(LiFSI) and $LiN(CF_3SO_2)_2$(LiTFSI), furthermore preferably $LiN(FSO_2)_2$.

If the electrolyte composition contains $LiN(FSO_2)_2$ and/or $LiN(CF_3SO_2)_2$, the total content of $LiN(FSO_2)_2$ and $LiN(CF_3SO_2)_2$ is 50% by mass to 98% by mass relative to 100% by mass of the total amount of the alkali metal salt, the photocurable and/or thermosetting monomer, and the salt dissociating agent. The total content is more preferably 52% by mass to 95% by mass, furthermore preferably 55% by mass to 90% by mass.

<Photocurable and/or Thermosetting Monomer>

The photocurable and/or thermosetting monomer is not particularly limited as long as containing a functional group polymerizable by light and/or heat. Examples of the functional group include a polymerizable unsaturated group, an epoxy group, and an isocyanate group.

The photocurable and/or thermosetting monomer has a hetero element in one preferred embodiment.

Examples of the hetero element include elements such as nitrogen, oxygen, sulfur, phosphorus, chlorine, iodine, and bromine. The hetero element is preferably oxygen and nitrogen, more preferably oxygen.

The photocurable and/or thermosetting monomer may contain one, two, or more polymerizable functional groups. Examples of the monofunctional monomer include: alkyl (meth)acrylates which may contain a substituent, such as methyl(meth)acrylate, ethyl(meth)acrylate, 3-chloro-2-hydroxypropyl(meth)acrylate, and 2-hydroxy-3-phenoxypropyl(meth)acrylate; alkoxy(poly)alkylene glycol(meth)acrylates such as a methoxy(poly)ethylene glycol (meth)acrylate, a methoxy(poly)propylene glycol(meth)acrylate, and phenoxyethylene glycol (meth)acrylate; carboxyl group-containing monomers such as 2-acryloyloxyethyl succinate, 2-acryloyloxyethyl tetrahydrophthalate, and (meth)acrylate; monofunctional epoxy compounds such as butyl glycidyl ether, tert-butyl glycidyl ether, benzyl glycidyl ether, and 2-ethylhexyl-glycidyl ether; and monofunctional allyl ether compounds such as ethylene glycol monoallyl ether.

Examples of the polyfunctional monomer containing two or more polymerizable functional groups include: polyfunctional (meth)acrylates such as 1,3-butanediol di(meth)acrylate, (poly)ethylene glycol di(meth)acrylate, (poly)propylene glycol di(meth)acrylate, (poly)ethylene (poly)propylene glycol di(meth)acrylate, dioxane glycol di(meth)acrylate, tricyclodecanedimethanol di(meth)acrylate, ethoxylated bisphenol A di(meth)acrylate, trimethylolpropan tri(meth)acrylate, ethoxylated trimethylolpropan tri(meth)acrylate, propoxylated trimethylolpropan tri(meth)acrylate, ethoxylated glycerin tri(meth)acrylate, pentaerythritol tri(meth)acrylate, and pentaerythritol tetra(meth)acrylate; polyfunctional epoxy compounds such as (poly)ethylene glycol diglycidyl ether, diethylene glycol diglycidyl ether, (poly)propylene glycol diglycidyl ether, 1,6-hexanediol diglycidyl ether, glycidyl (meth)acrylate, α-methyl glycidyl (meth)acrylate, 3,4-epoxycyclohexylmethyl(meth)acrylate, epoxybutene, 3,4-epoxy-1-pentene, 1,2-epoxy-5,9-cyclododecadiene, 3,4-epoxy-1-vinylcyclohexene, 1,2-epoxy-5-cyclooctene, vinyl glycidyl ether, allyl glycidyl ether, 4-vinylcyclohexyl glycidyl ether, α-terpinyl glycidyl ether, cyclohexenylmethyl glycidyl ether, 4-vinylbenzyl glycidyl ether, 4-allylbenzyl glycidyl ether, allyl glycidyl ether, ethylene glycol allyl glycidyl ether, ethylene glycol vinyl glycidyl ether, diethylene glycol allyl glycidyl ether, diethylene glycol vinyl glycidyl ether, triethylene glycol allyl glycidyl ether, triethylene glycol vinyl glycidyl ether, oligoethylene glycol allyl glycidyl ether, oligoethylene glycol vinyl glycidyl ether; polyfunctional vinyl compounds such as vinyloxyethyl (meth)acrylate, vinyloxyethoxyethyl (meth)acrylate, 1-(meth)acryloyl-4-cyano-4-(meth)acryloylamino-2,2,6,6-tetramethylpiperidine; cyanate group-containing compounds such as 2-(meth)acroyloxyethyl isocyanate, (meth)acryloyl isocyanate, and m-isopropenyl-α,α-dimethylbenzyl isocyanate; and an acrylate group-containing urethane acrylates having a urethane bond. These polyfunctional monomers may be used alone, or two or more kinds may be used in combination.

The photocurable and/or thermosetting monomer contains a polyfunctional monomer in one preferred embodiment.

The photocurable and/or thermosetting monomer contains an ether group in one preferred embodiment. In one more preferred embodiment, the photocurable and/or thermosetting monomer has a structural unit derived from alkylene oxide.

Examples of the photocurable and/or thermosetting monomer having a structural unit derived from alkylene oxide include the (alkoxy)(poly)alkylene glycol(meth)acrylates, polyfunctional (meth)acrylates, and polyfunctional epoxy compounds described above.

The photocurable and/or thermosetting monomer having a structural unit derived from alkylene oxide may also be used in combination with another polyfunctional monomer in one preferred embodiment. The polyfunctional monomer used in combination is urethane acrylate in one preferred embodiment.

Using the monofunctional monomer having a structural unit derived from alkylene oxide and urethane acrylate in combination is one suitable embodiment of the present invention.

The monofunctional monomer having a structural unit derived from alkylene oxide may be a compound represented by the following formula (2) in one preferred embodiment.

[Chemical Formula 1]

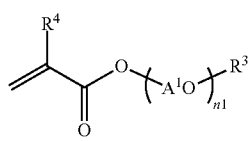

(2)

(In the formula (2), $R^3$ is identical or different and represents a hydrogen atom or a hydrocarbon group with a carbon number of 1 to 30. $R^4$ is identical or different and represents a hydrogen atom or a methyl group. $A^1O$ is identical or different and represents an oxyalkylene group. In addition, n1 represents the number of 1 to 50.)

The polyfunctional monomer having a structural unit derived from alkylene oxide is a compound represented by the following formula (3) in one preferred embodiment.

[Chemical Formula 2]

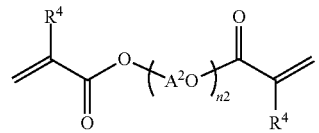

(3)

(In the formula (3), $R^4$ is identical or different and represents a hydrogen atom or a methyl group. $A^2O$ is identical or different and represents an oxyalkylene group. In addition, n2 represents the number of 1 to 50.)

In the formula (2), $R^3$ represents a hydrogen atom or a hydrocarbon group with a carbon number of 1 to 30.

Examples of the hydrocarbon group with a carbon number of 1 to 30 include an aliphatic alkyl group with a carbon number of 1 to 30, an alicyclic alkyl group with a carbon number of 3 to 30, and an aryl group with a carbon number of 6 to 30.

Examples of the aliphatic or alicyclic alkyl group include: a methyl group, an ethyl group, a n-propyl group, a n-butyl group, a n-pentyl group (or an amyl group), a n-hexyl group, a n-heptyl group, a n-octyl group, a n-nonyl group, a n-decyl group, a n-undecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, a n-eicosanyl group, an i-propyl group, a sec-butyl group, an i-butyl group, a t-butyl group, a 1-methylbutyl group, a 1-ethylpropyl group, a 2-methylbutyl group, an i-amyl group, a neopentyl group, a 1,2-dimethylpropyl group, a 1,1-dimethylpropyl group, a t-amyl group, a 1,3-dimethylbutyl group, a 3,3-dimethylbutyl group, a 2-ethylbutyl group, a 2-ethyl-2-methylpropyl group, a 1-methylheptyl group, a 2-ethylhexyl group, a 1,5-dimethylhexyl group, a t-octyl group, a branched nonyl group, a decyl group, a dodecyl group, a stearyl group, an icosyl group, a cyclopropyl group, a cyclopropylmethyl group, a cyclobutyl group, a cyclobutylmethyl group, a cyclopentyl group, a cyclohexyl group, a cyclohexylmethyl group, a cycloheptyl group, a cyclooctyl group, a cyclohexylpropyl group, a cyclododecyl group, a norbornyl group (C7), an adamantyl group (C10), and a cyclopentylethyl group.

The carbon number in the alkyl group with a carbon number of 1 to 30 is preferably 1 to 22, more preferably 1 to 18, furthermore preferably 1 to 12, still more preferably 1 to 8, particularly preferably 1 to 4.

Examples of the aryl group with a carbon number of 6 to 30 include: a phenyl group; a naphthyl group; and aralkyl groups such as a benzyl group, a 1-phenyl ethyl group, a 2-phenyl ethyl group, a 3-phenyl propyl group, a 4-phenyl butyl group, a styryl group (Ph-CH=C— group), a cinnamyl group (Ph-CH=CHCH$_2$— group), a 1-benzocyclobutenyl group, and a 1,2,3,4-tetrahydronaphthyl group.

The carbon number in the aryl group with a carbon number of 6 to 30 is preferably 6 to 20, more preferably 6 to 10.

Although $A^1O$ in the formula (2) and $A^2O$ in the formula (3) are "identical or different" and each represent the oxyalkylene group, this means that all of n1 or n2 piece(s) oxyalkylene groups present in polyalkylene glycol may be identical to or different from each other.

The oxyalkylene group described above is an alkylene oxide adduct. Examples of such an alkylene oxide include alkylene oxides with a carbon number of 2 to 8, such as ethylene oxide, propylene oxide, butylene oxide, isobutylene oxide, 1-butene oxide, 2-butene oxide, and styrene oxide. The alkylene oxide is preferably alkylene oxide with a carbon number of 2 to 4, such as ethylene oxide, propylene oxide, and butylene oxide, more preferably ethylene oxide and propylene oxide.

The polyalkylene glycol described above contains two or more kinds of alkylene oxide adducts freely selected from ethylene oxide, propylene oxide, butylene oxide, and styrene oxide, for example, in any form of random addition, block addition, or alternating addition. In addition, the polyalkylene glycol preferably contains an oxyethylene group as an oxyalkylene group and essential component, more preferably at 50% by mole or more, furthermore preferably at 80% by mole or more.

The number n1 in the formula (2) described above is 1 to 50, preferably 2 to 45, more preferably 5 to 40.

The number n2 in the formula (3) described above is 1 to 50, preferably 2 to 45, more preferably 5 to 40.

The $R^4$ in each of the formulae (2) and (3) is a hydrogen atom or a methyl group in one preferred embodiment.

The monofunctional monomer having a structural unit derived from alkylene oxide is more preferably (poly) alkylene glycol (meth)acrylates such as ethylene glycol (meth)acrylate, diethylene glycol (meth)acrylate, propylene glycol(meth) acrylate, or dipropylene glycol (meth)acrylate; and alkoxy(poly)alkylene glycol(meth)acrylate such as methoxy(poly)ethylene glycol (meth)acrylate or ethoxy (poly)ethylene glycol (meth)acrylate. The monofunctional monomer is furthermore preferably methoxy(poly)ethylene glycol (meth)acrylate.

The polyfunctional monomer having a structural unit derived from alkylene oxide is more preferably (poly) alkylene glycol di(meth)acrylate such as ethylene glycol di(meth)acrylate, diethylene glycol di(meth)acrylate, triethylene glycol di(meth)acrylate, propylene glycol di(meth) acrylate, dipropylene glycol di(meth)acrylate, or tripropylene glycol di(meth)acrylate. The monofunctional monomer is furthermore preferably polyethylene glycol di(meth)acrylate.

As described above, the photocurable and/or thermosetting monomer contains the polyfunctional monomer in one preferred embodiment. The content of the polyfunctional monomer is preferably 30% by mass to 100% by mass relative to 100% by mass of the total amount of the photocurable and/or thermosetting monomer. The content of the polyfunctional monomer is more preferably 40% by mass to 100% by mass, furthermore preferably 50% by mass to 100% by mass.

As described above, the photocurable and/or thermosetting monomer contains the monomer having a structural unit derived from alkylene oxide in one preferred embodiment. The content of the monomer is preferably 30% by mass to 100% by mass relative to 100% by mass of the total amount of the photocurable and/or thermosetting monomer. The content of the monomer is more preferably 40% by mass to 100% by mass, furthermore preferably 50% by mass to 100% by mass.

In view of solubility of the alkali metal salt, the content of the monomer having a structural unit derived from alkylene oxide may be 60% by mass to 100% by mass or 80% by mass to 100% by mass relative to 100% by mass of the total amount of the photocurable and/or thermosetting monomer.

The molecular weight of the photocurable and/or thermosetting monomer is not particularly limited, but is preferably 4000 or less. The molecular weight is more preferably 3800 or less, furthermore preferably 3500 or less.

<Salt Dissociating Agent>

The salt dissociating agent is not particularly limited as long as promoting dissociation of the alkali metal salt into ions, and is a compound having hetero element in one preferred embodiment.

Examples of the compound having hetero element include a carbonate compound, a sulfonyl compound, a nitrile compound, a carboxylic acid anhydride, a sulfate ester compound, a thioether compound, a sulfite ester compound, a nitrogen-containing chain compound, or a nitrogen-containing cyclic compound.

Among these compounds, the carbonate compound, the sulfonyl compound, and/or the nitrile compound is/are selected in one preferred embodiment. The salt dissociating agent described above containing the carbonate compound, the sulfonyl compound, and/or the nitrile compound further promotes the dissociation of the alkali metal salt into the ions, and further improves the ion conductivity of the composition.

Examples of the carbonate compound include cyclic carbonates such as ethylene carbonate (EC), propylene carbonate (PC), vinylene carbonate (VC), vinyl ethylene carbonate (VEC), methyl vinylene carbonate (MVC), and ethyl vinylene carbonate (EVC); and fluorinated cyclic carbonates such as fluoroethylene carbonate and trifluoropropylene carbonate. Among these carbonate compounds, the carbonate compound is ethylene carbonate and fluoroethylene carbonate in one preferred embodiment, and ethylene carbonate in one more preferred embodiment.

Examples of the sulfonyl compound include sulfones such as dimethyl sulfone, ethyl methyl sulfone, diethyl sulfone, n-propyl methyl sulfone, isopropyl methyl sulfone, n-butyl methyl sulfone, and tert-butyl methyl sulfone; sulfolanes such as sulfolane (tetramethylene sulfone), 2-methylsulfolane, 3-methylsulfolane, and 2,4-dimethylsulfolane; sultones such as 1,3-propane sultone and 1,4-butane sultone; busulfan; and 3-sulfolene.

The sulfonyl compound is dimethyl sulfone, 3-sulfolene and sulfolane in one preferred embodiment.

Examples of the nitrile compound include a mononitrile compound and a dinitrile compound.

Examples of the mononitrile compound include hexanenitrile, heptanenitrile, octanenitrile, pelargononitrile, decanenitrile, undecanenitrile, dodecanenitrile, cyclopentanecarbonitrile, cyclohexanecarbonitrile, crotononitrile, 3-methylcrotononitrile, 2-methyl-2-butenenitrile, 2-pentenenitrile, 2-methyl-2-pentenenitrile, 3-methyl-2-pentenenitrile, and 2-hexenenitrile.

Examples of the dinitrile compound include malononitrile, succinonitrile, glutaronitrile, adiponitrile, pimelonitrile, suberonitrile, azelanitrile, sebaconitrile, undecanedinitrile, dodecanedinitrile, methylmalononitrile, ethylmalononitrile, isopropylmalononitrile, tert-butylmalononitrile, methylsuccinonitrile, 2,2-dimethylsuccinonitrile, 2,3-dimethylsuccinonitrile, 2,3,3-trimethylsuccinonitrile, 2,2,3,3-tetramethylsuccinonitrile, 2,3-diethyl-2,3-dimethylsuccinonitrile, 2,2-diethyl-3,3-dimethylsuccinonitrile, bicyclohexyl-1,1-dicarbonitrile, bicyclohexyl-2, 2-dicarbonitrile, bicyclohexyl-3,3-dicarbonitrile, 2,5-dimethyl-2,5-hexanedicarbonitrile, 2,3-diisobutyl-2,3-dimethylsuccinonitrile, 2,2-diisobutyl-3,3-dimethylsuccinonitrile, 2-methylglutaronitrile, 2,3-dimethylglutaronitrile, 2,4-dimethylglutaronitrile, 2,2,3,3-tetramethylglutaronitrile, 2,2,4,4-tetramethylglutaronitrile, 2,2,3,4-tetramethylglutaronitrile, 2,3,3,4-tetramethylglutaronitrile, maleonitrile, fumaronitrile, 1,4-dicyanopentane, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,3'-(ethylenedioxy)dipropionitrile, 3,3'-(ethylenedithio)dipropionitrile, and 3,9-bis(2-cyanoethyl)-2,4,8,10-tetraoxaspiro[5,5]undecane.

The nitrile compound is preferably a dinitrile compound, more preferably a compound represented by the following formula (4).

[Chemical Formula 3]

(4)

(In the formula (4), $R^5$ represents an alkyl group with a carbon number of 1 to 6 or an aryl group with a carbon number of 6 to 10.)

The $R^5$ described above is an alkyl group with a carbon number of 1 to 6 in one preferred embodiment. Examples of the alkyl group with a carbon number of 1 to 6 include methyl, ethyl, n-propyl, isopropyl, n-butyl, t-butyl, n-pentyl, isopentyl, and n-hexyl.

The dinitrile compound is preferably malononitrile, succinonitrile, glutaronitrile, adiponitrile, pimelonitrile, and suberonitrile, more preferably malononitrile, succinonitrile, glutaronitrile, and adiponitrile.

Examples of the carboxylic acid anhydride include succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride, and phenyl succinic anhydride.

Examples of the sulfate ester compound include methyl methanesulfonate and trimethylene glycol sulfate ester.

Examples of the thioether compound include tetramethylthiuram monosulfide.

Examples of the sulfite ester compound include ethylene sulfite.

Examples of the nitrogen-containing compound include nitrogen-containing chain compounds such as dimethylformamide and dimethylacetamide; and nitrogen-containing cyclic compounds such as 1-methyl-2-pyrrolidinone, 1-methyl-2-piperidone, 3-methyl-2-oxazolidinone, 1,3-dimethyl-2-imidazolidinone, and N-methylsuccinimide.

The salt dissociating agent is more preferably malononitrile, succinonitrile, glutaronitrile, adiponitrile, ethylene carbonate, propylene carbonate, fluoroethylene carbonate, sulfolane, and dimethylacetamide, furthermore preferably malononitrile, succinonitrile, glutaronitrile, ethylene carbonate, propylene carbonate, and dimethylacetamide, most preferably succinonitrile and ethylene carbonate.

<Polymerization Initiator>

The electrolyte composition according to the present invention contains a polymerization initiator in one preferred embodiment. Examples of the polymerization initiator include a photoradical polymerization initiator, a thermal radical polymerization initiator, an anionic polymerization initiator, a photoanionic polymerization initiator, and an epoxy resin curing agent. The photoradical polymerization initiator generates polymerization initiation radicals through irradiation with active energy rays. The thermal radical polymerization initiator generates polymerization initiation radicals through heating. The photoanionic polymerization initiator generates polymerization initiation anion species through irradiation with active energy rays to initiate a polymerization reaction. The epoxy resin curing agent is used as a curing agent when curing the epoxy resin, and initiates a ring-opening polymerization reaction of an epoxy group. The term "anionic polymerization initiator" herein means a component that initiates a polymerization reaction that generates polymerization initiator anion species and does not correspond to a photoanionic polymerization initiator.

The photoradical polymerization initiator described above is not particularly limited. Examples thereof include: acetophenones such as diethoxyacetophenone, 2-hydroxy-2-methyl-1-phenylpropane-1-one, benzyl dimethyl ketal, 4-(2-hydroxyethoxy)phenyl-(2-hydroxy-2-propyl) ketone, 1-hydroxycyclohexyl phenyl ketone, 2-methyl-2-morpholino(4-thiomethylphenyl)propan-1-one, 2-benzyl-2-dimethylamino-1-(4-morpholinophenyl)butanone, 2-hydroxy-2-methyl-1-[4-(1-methylvinyl)phenyl]propanone oligomer, 2,2-dimethoxy-1,2-diphenylethane-1-one, 1-[4-(2-hydroxyethoxy)phenyl]-2-hydroxy-2-methyl-1-propane-1-one, 2-hydroxy-1-{4-[4-(2-hydroxy-2-methylpropionyl)benzyl]phenyl}-2-methylpropane-1-one, and 2-dimethylamino-2-[(4-methylphenyl)methyl]-1-[4-(4-morholyl)phenyl]-1-butanone; benzophenones such as benzophenone, o-benzoyl methyl benzoate, 4-phenylbenzophenone, 4-benzoyl-4'-methyl-diphenyl sulfide, 3,3',4,4'-tetra(t-butylperoxylcarbonyl)benzophenone, 2,4,6-trimethylbenzophenone, 4-benzoyl-N, N-dimethyl-N-[2-(1-oxo-2-propenyloxy)ethyl]benzenemethanaminium bromide, and (4-benzoylbenzyl) trimethylammonium chloride; benzoins such as benzoin, benzoin methyl ether, benzoin ethyl ether, benzoin isopropyl ether, and benzoin isobutyl ether; thioxanthons such as 2-isopropylthioxanthone, 4-isopropylthioxanthone, 2,4-diethylthioxanthone, 2,4-dichlorothioxanthone, 1-chloro-4-propoxythioxanthone, and 2-(3-dimethylamino-2-hydroxy)-3,4-dimethyl-9H-thioxanthone-9-onemethochloride; acylphosphine oxides such as 2,4,6-trimethylbenzoyldiphenylphosphine oxide and bis(2,4,6-trimethylbenzoyl)phenylphosphine oxide; titanocenes such as bis(η5-2,4-cyclopentadiene-1-yl)-bis(2,6-difluoro-3-(1H-pyrrole-1-yl) phenyl)titanium; oxime esters such as 1,2-octanedione, 1-[4-(phenylthio)-,2-(O-benzoyloxime)], ethanone, 1-[9-ethyl-6-(2-methylbenzoyl)-9H-carbazole-3-yl]-, and 1-(O-acetyloxime); and oxyphenylacetic acid esters such as oxyphenylacetic acid, 2-[2-oxo-2-phenylacetoxyethoxy) ethyl ester, oxyphenylacetic acid, and 2-(2-hydroxyethoxy) ethyl ester. These photoradical polymerization initiators may be used alone, or in combination of two or more kinds of them. Out of these photoradical polymerization initiators, suitable are acetophenones, benzophenones, and acylphosphine oxides. Particularly suitable are 1-hydroxycyclohexyl phenyl ketone, benzophenone, 2-hydroxy-2-methyl-1-phenylpropane-1-one, 2-methyl-2-morpholino(4-thiomethylphenyl)propane-1-one, 1-[4-](2-hydroxyethoxy)phenyl]-2-hydroxy-2-methyl-1-propane-1-one, and 2,4,6-trimethylbenzoyl diphenylphosphine oxide.

The thermal radical polymerization initiator described above is not particularly limited. Examples thereof include: organic peroxide-based initiators such as methyl ethyl ketone peroxide, cyclohexanone peroxide, methyl cyclohexanone peroxide, methyl acetoacetate peroxide, acetyl acetate peroxide, 1,1-bis(t-hexylperoxy)-3,3,5-trimethylcyclohexane, 1,1-bis(t-hexylperoxy)-cyclohexane, 1,1-bis(t-butylperoxy)-3,3,5-trimethylcyclohexane, 1,1-bis(t-butylperoxy)-2-methylcyclohexane, 1,1-bis(t-butylperoxy)-cyclohexane, 1,1-bis(t-butylperoxy)cyclododecane, 1,1-bis(t-butylperoxy)butane, 2,2-bis(4,4-di-t-butylperoxycyclohexyl)propane, p-menthane hydroperoxide, diisopropylbenzene hydroperoxide, 1,1,3,3-tetramethylbutyl hydroperoxide, cumene hydroperoxide, t-hexyl hydroperoxide, t-butyl hydroperoxide, α,α'-bis(t-butylperoxy)diisopropylbenzene, dicumyl peroxide, 2,5-dimethyl-2,5-bis(t-butylperoxy)hexane, t-butylcumyl peroxide, di-t-butyl peroxide, 2,5-dimethyl-2,5-bis(t-butylperoxy)hexyne-3, isobutyryl peroxide, 3,5,5-trimethylhexanoyl peroxide, octanoyl peroxide, lauroyl peroxide, stearoyl peroxide, succinic acid peroxide, m-toluoyl peroxide, benzoyl peroxide, di-n-propyl peroxydicarbonate, diisopropyl peroxydicarbonate, bis(4-t-butylcyclohexyl) peroxydicarbonate, di-2-ethoxyethyl peroxydicarbonate, di-2-ethoxyhexyl peroxydicarbonate, di-3-methoxybutyl peroxydicarbonate, di-s-butyl peroxydicarbonate, di(3-methyl-3-methoxybutyl) peroxydicarbonate, α,α'-bis(neodecanoylperoxy)diisopropylbenzene, cumyl peroxyneodecanoate, 1,1,3,3-tetramethylbutyl peroxyneodecanoate, 1-cyclohexyl-1-methylethyl peroxyneodecanoate, t-hexyl peroxyneodecanoate, t-butyl peroxyneodecanoate, t-hexyl peroxypivalate, t-butyl peroxypivalate, 1,1,3,3-tetramethylbutylperoxy-2-ethylhexanoate, 2,5-dimethyl-2,5-bis(2-ethyl hexanoyl peroxy)hexane, 1-cyclohexyl-1-methylethylperoxy-2-ethylhexanoate, t-hexylperoxy-2-ethylhexanoate, t-butylperoxy-2-ethylhexanoate, t-hexylperoxy isopropyl monocarbonate, t-butylperoxy isobutyrate, t-butyl peroxymalate, t-butylperoxy-3,5,5-trimethylhexanoate, t-butyl peroxylaurate, t-butylperoxyisopropyl monocarbonate, t-butylperoxy-2-ethylhexyl monocarbonate, t-butyl peroxyacetate, t-butylperoxy-m-toluyl benzoate, t-butyl peroxybenzoate, bis(t-butylperoxy)isophthalate, 2,5-dimethyl-2,5-bis(m-toluylperoxy)hexane, t-hexyl peroxybenzoate, 2,5-dimethyl-2,5-bis(benzoylperoxy)hexane, t-butylperoxyallyl monocarbonate, t-butyltrimethylsilyl peroxide, 3,3',4,4'-tetra(t-butylperoxycarbonyl)benzophenone, and 2,3-dimethyl-2,3-diphenylbutane.

Examples further include azo-based initiators such as 2-phenylazo-4-methoxy-2,4-dimethylvaleronitrile, 1-[(1-cyano-1-methylethyl)azo] formamide, 1,1'-azobis(cyclohexane-1-carbonitrile), 2,2'-azobis(2-methylbutyronitrile), 2,2'-azobisisobutyronitrile, 2,2'-azobis(2,4-dimethylvaleronitrile), 2,2'-azobis(4-methoxy-2,4-dimethylvaleronitrile), 2,2'-azobis(2-methylpropionamidine) dihydrochloride, 2,2'-azobis(2-methyl-N-phenyl(propionamidine) dihydrochloride, 2,2'-azobis[N-(4-chlorophenyl)-2-methylpropionamidine)]dihydrochloride, 2,2'-azobis[N-(4-hydrophenyl)-2-methylpropionamidine)]dihydrochloride, 2,2'-azobis[2-methyl-N-(phenylmethyl)propionamidine]dihydrochloride, 2,2'-azobis[2-methyl-N-(2-propenyl)propionamidine)]dihydrochloride, 2,2'-azobis[N-(2-hydroxyethyl)-2-methylpropionamidine)]dihydrochloride, 2,2'-azobis[2-(5-methyl-2-imidazolin-2-yl)propane) dihydrochloride, 2,2'-azobis[2-(2-imidazolin-2-yl)propane) dihydrochloride, 2,2'-azobis[2-(4,5,6,7-tetrahydro-1H-1,3-diazepine-2-yl)propane) dihydrochloride, 2,2'-azobis[2-(3,4,5,6-tetrahydropyrimidine-2-yl)propane) dihydrochloride, 2,2'-azobis[2-(5-hydroxy-3,4,5,6-tetrahydropyrimidine-2-yl)propane) dihydrochloride, 2,2'-azobis{2-[1-(2-hydroxy)ethyl]-2-imidazolin-2-yl]propane} dihydrochloride, 2,2'-azobis[2-(2-imidazolin-2-yl)propane], 2,2'-azobis{2-methyl-N-[1,1-bis(hydroxymethyl)-2-hydroxyethyl]propionamide}, 2,2'-azobis{2-methyl-N-[1,1-bis(hydroxymethyl)ethyl]propionamide}, 2,2'-azobis[2-methyl-N-(2-hydroxyethyl)propionamide], 2,2'-azobis(2-methylpropionamide), 2,2'-azobis(2,4,4-trimethylpentane), 2,2'-azobis(2-methylpropane), dimethyl 2,2'-azobis(2-methylpropionate), 4,4'-azobis(4-cyanopentanoic acid), and 2,2'-azobis[2-(hydroxymethyl)propionitrile];

Examples further include: acetophenones such as diethoxyacetophenone, 2-hydroxy-2-methyl-1-phenylpropane-1-one, benzyl dimethyl ketal, 4-(2-hydroxyethoxy)phenyl-(2-hydroxy-2-propyl)ketone, 1-hydroxycyclohexyl phenyl ketone, 2-methyl-2-morpholino(4-thiomethylphenyl)propan-1-one, 2-benzyl-2-dimethylamino-1-(4-morpholinophenyl) butanone, 2-hydroxy-2-methyl-1-[4-(1-methylvinyl)phenyl]propanone oligomers; benzoins such as benzoin, benzoin methyl ether, benzoin ethyl ether, benzoin isopropyl ether, and benzoin isobutyl ether; benzophenones such as benzophenone, o-benzoyl methyl benzoate, 4-phenylbenzophenone, 4-benzoyl-4'-methyl-diphenyl sulfide, 3,3',4,4'-tetra(t-butylperoxylcarbonyl)benzophenone, 2,4,6-trimethylbenzophenone, 4-benzoyl-N,N-dimethyl-N-[2-(1-oxo-2-propenyloxy)ethyl]benzenemethanaminium bromide, and (4-benzoylbenzyl)trimethylammonium chloride; and thioxanthons such as 2-isopropylthioxanthone, 4-isopropylthioxanthone, 2,4-diethylthioxanthone, 2,4-dichlorothioxanthone, 1-chloro-4-propoxythioxanthone, and 2-(3-dimethylamino-2-hydroxy)-3,4-dimethyl-9H-thioxanthone-9-one methochloride. These thermal radical polymerization initiators may be used alone, or in combination of two or more kinds of them. Out of these thermal radical polymerization initiators, preferable are organic peroxide-based initiators and azo-based initiators.

The anionic polymerization initiator described above is not particularly limited. Examples thereof include: alkali metal compounds containing a carbon anion and an alkali metal such as sodium naphthalene, n-butyllithium, and t-butyllithium; trialkylaluminums such as trimethylaluminum, triethylaluminum, tripropylaluminum, triisopropylaluminum, tributylaluminum, and triisobutylaluminum; chlorodialkylaluminum, chlorodiethylaluminum, chlorodipropylaluminum, chlorodiisopropylaluminum, chlorodibutylaluminum, chlorodiisobutylaluminum, bis(pentamethylcyclopentadienyl)samarium, and methyl-bis(pentamethylcyclopentadienyl)samarium.

The photoanionic polymerization initiator described above is not particularly limited. Examples thereof include alkoxy titanium and p-chlorophenyl-o-nitrobenzyl ether.

These anionic and/or photoanionic polymerization initiators may be used alone, or in combination of two or more kinds of them.

The epoxy resin curing agent described above is not particularly limited. Examples thereof include: chain aliphatic polyamines such as diethylenetriamine, triethylenetetramine, and dipropylenediamine; cyclic aliphatic polyamines such as N-aminoethylpiperazine, mensendiamine, and isophorondiamine; aromatic amines such as meta-phenylenediamine and diaminodiphenylmethane; tertiary amines such as 1,8-diazabicyclo(5,4,0)-undecene-7,1,5-diazabicyclo(4,3,0)-nonene-5, and tris(dimethylaminomethyl)phenol; imidazoles such as 1-cyanoethyl-2-ethyl-4-methylimidazole and 2-ethyl-4-methylimidazole; acid anhydrides such as ethylene glycol bis(trimellitate), tetrahydrophthalic anhydride, succinic anhydride, methylcyclohexene dicarboxylic anhydride, chlorendic anhydride, poly(azelaic anhydride), and 4-methylhexahydrophthalic anhydride; photocationic polymerization initiators such as diphenyliodonium hexafluorophosphate and triphenylsulfonium hexafluorophosphate; dicyandiamide, triphenylphosphine, and tetraphenylphosphonium tetraphenyl borate. These epoxy resin curing agents may be used alone, or in combination of two or more kinds of them.

<Other Components>

The electrolyte composition according to the present invention may contain components besides the alkali metal salt, the photocurable and/or thermosetting monomer, the salt dissociating agent, and the polymerization initiator. Examples of the other components include: polymers such as polyether-based polymers, (meth)acrylic polymers, nitrile-based polymers, and fluorine-based polymers; saturated hydrocarbon compounds such as heptane, octane, and cycloheptane; and organic solvents such as acetonitrile, propionitrile, butyronitrile, pentanenitrile, dimethyl carbonate (DMC), diethyl carbonate (DEC), ethyl methyl carbonate (EMC), and sultone.

The content of the other components is preferably 30% by mass or less relative to 100% by mass of the total amount of the alkali metal salt, the photocurable and/or thermosetting monomer, and the salt dissociating agent. The content is more preferably 25% by mass or less, furthermore preferably 20% by mass % or less.

[Electrolyte Film]

The present invention is also directed to an electrolyte film obtained by curing the electrolyte composition described above.

The present invention is also directed to a method of using the electrolyte composition as a material of the electrolyte film.

The electrolyte composition according to the present invention has excellent film-forming properties. An electrolyte film can thus be formed without using any support (or separator). That is, a self-supporting film can be formed.

The electrolyte film according to the present invention is a self-supporting film including no support in one preferred embodiment, but may include a support.

The support (separator) is not particularly limited. Examples thereof include a woven fabric, a nonwoven fabric, a (micro)porous film, and a glass molded article.

Examples of the woven and nonwoven fabrics include: polyolefin-based resins such as polypropylene, polyethylene, and polymethylpentene; polyester-based resins such as polyethylene terephthalate (PET); polyamide-based resins such as nylon; aramid-based resins such as polyparaphenylene terephthalamide; an acrylic resin; a polyvinyl alcohol-based resin; a cellulose-based resin (cellulosic fibers); alumina fibers, ceramic fibers, and glass fibers.

Examples of the (micro)porous film include: polyolefin-based resins such as polypropylene, polyethylene, and an ethylene-propylene copolymer; polyester-based resins; fluororesins such as a tetrafluoroethylene-perfluoroalkoxyethylene copolymer; polyetheretherketone, polybutylene terephthalate, polyphenylene sulfide, a polyamide-based resin, and polyimide.

Examples of the glass molded article include glass cloth.

These separators may be, for use, subjected to hydrophilization treatment by a technique of applying a surfactant, a technique such as sulfonation, fluorination, and grafting with chemicals such as oleum (fuming sulfuric acid) or chlorosulfonic acid, or a technique such as corona discharge or plasma discharge, in order to further improve the hydrophilicity.

The separator is preferably at least one selected from the group consisting of a cellulose nonwoven fabric, a PET nonwoven fabric, a glass nonwoven fabric, a polyolefin nonwoven fabric, a polyolefin microporous film, and a polyimide porous film. The separator is more preferably a cellulose nonwoven fabric and a polyolefin microporous film.

The electrolyte film preferably has a film thickness of 5 µm to 300 µm. The thickness is more preferably 10 µm to 250 µm, furthermore preferably 15 µm to 200 µm.

[Method of Manufacturing Electrolyte Film]

In order to obtain an electrolyte film by curing the electrolyte composition according to the present invention, used is an organic solvent with a lower boiling point than the salt dissociating agent. However, an electrolyte film can be obtained without using any organic solvent in the case in which the alkali metal salt and the salt dissociating agent in the electrolyte composition can be dissolved in the photocurable and/or thermosetting monomer, or in the case in which the alkali metal salt and the photocurable and/or thermosetting monomer can be dissolved in the salt dissociating agent. Thus, these cases are preferred in view of the safety and environment.

The present invention is also directed to a method of manufacturing an electrolyte film. The method includes a step of curing the electrolyte composition described above. The amount of the organic solvent with a lower boiling point than the salt dissociating agent used in the step of curing is 20% by mass or less relative to 100% by mass of the total amount of the alkali metal salt, the photocurable and/or thermosetting monomer, and the salt dissociating agent in the composition.

The present invention is also directed to an electrolyte film obtained by curing the electrolyte composition described above. The content of the organic solvent with a lower boiling point than the salt dissociating agent in the electrolyte composition is 20% by mass or less relative to 100% by mass of the total amount of the alkali metal salt, a polymer with a structural unit derived from a photocurable and/or thermosetting monomer, and the salt dissociating agent.

The amount of the organic solvent with a lower boiling point than the salt dissociating agent used in the step of curing and the content of the organic solvent in the electrolyte composition are preferably 18% by mass or less, more preferably 15% by mass or less, furthermore preferably 12% by mass or less, particularly preferably 10% by mass or less.

The organic solvent is not particularly limited as long as having a lower boiling point than the salt dissociation agent. In one preferred embodiment, the organic solvent uniformly dissolves the alkali metal salt, the photocurable and/or thermosetting monomer, and the salt dissociating agent.

Specific examples of the organic solvent preferably include acetonitrile, dimethyl carbonate, and ethyl methyl carbonate.

The difference in the boiling point between the organic solvent and the salt dissociating agent is preferably 50° C. or more, more preferably 80° C. or more, most preferably 100° C. or more. The difference in the boiling point within the preferable range described above sufficiently suppresses a decrease in the salt dissociating agent in drying the organic solvent, and exhibits the advantages of the present invention more sufficiently.

On the other hand, the boiling point of the organic solvent is preferably 150° C. or lower, more preferably 120° C. or lower.

[Battery Material]

The electrolyte composition according to the present invention can be suitably used as a material of various batteries such as electrolyte films or electrodes.

In this manner, the battery material using the electrolyte composition according to the present invention is also one aspect of the present invention.

<Electrode>

The electrolyte composition according to the present invention can be suitably used as a material of electrodes for batteries.

An electrode containing the electrolyte composition according to the present invention is also one aspect of the present invention. The electrolyte composition according to the present invention may be used in any of positive and negative electrodes.

The positive electrode is a positive electrode current collector carrying a positive electrode active material composition containing a positive electrode active material, a conductive auxiliary agent, a binder, and a dispersion solvent, for example. The positive electrode is typically formed in a sheet.

Examples of the method of manufacturing a positive electrode include: a method in which a positive electrode current collector is coated with a positive electrode active material composition by a doctor blade technique, or is immersed in a positive electrode active material composition, and is then dried; a method in which a sheet obtained by kneading, molding, and drying a positive electrode active material composition is bonded to a positive electrode current collector via a conductive adhesive, and is then pressed and dried; and a method in which a positive electrode active material composition containing a liquid lubricant is applied or casted onto a positive electrode current collector to mold into a desired shape, the liquid lubricant is then removed, and the resultant composition is stretched monoaxially or multiaxially.

The material of the positive electrode current collector is not particularly limited. For example, a conductive metal such as aluminum, an aluminum alloy, stainless steel (SUS), or titanium may be used. Among these, the material is aluminum in one preferred embodiment in view of lower costs and excellent processability into a thin film.

As the positive electrode active material, any known positive electrode active material may be used as long as being capable of storing and discharging ions. Specifically, examples of the positive electrode active material include: transition metal oxides such as $MCoO_2$, $MNiO_2$, $MMnO_2$, and ternary oxides represented by $MNi_{1-x-y}Co_xMn_yO_2$ or $MNi_{1-x-y}Co_xMn_yO_2$ (where $0 \leq x \leq 1$ and $0 \leq y \leq 1$); nickel manganic acid represented by $M_xNi_yMn_{(2-y)}O_4$ (where $0.9 \leq x \leq 1$ and $0 \leq y \leq 1$); compounds having an olivine structure such as $MAPO_4$ (where A is Fe, Mn, Ni, or Co); a solid solution material containing a plurality of transition metals (e.g., a solid solution containing an electrochemically inactive layered $M_2MnO_3$ and an electrochemically active layered MM"O (where M" is a transition metal such as Co or Ni)) (M represents an alkali metal ion). These positive electrode active materials may be used alone or in combination.

Examples of the conductive auxiliary agent include acetylene black, carbon black, graphite, metal powder materials, single-walled carbon nanotubes, multi-walled carbon nanotubes, and vapor-grown carbon fibers.

Examples of the binder include: fluorine-based resins such as polyvinylidene fluoride and polytetrafluoroethylene; synthetic rubbers such as a styrene-butadiene rubber and a nitrile-butadiene rubber; polyamide-based resins such as polyamideimide; polyolefin-based resins such as polyethylene and polypropylene; poly(meth)acrylic resins; polyacrylic acids; and cellulose-based resins such as carboxymethyl cellulose. These binders may be used alone or in a mixture of a plurality of kinds of them. These binders may be, in use, dissolved or dispersed in a solvent.

The amount of the conductive auxiliary agent and the binder added may be adjusted as appropriate in view of the intended use (e.g., focusing on outputs or energy), the ion conductivity, or any other characteristic of the battery.

The solvent used in the positive electrode active material composition in manufacturing the positive electrode includes N-methylpyrrolidone, dimethylformamide, dimethylacetamide, methyl ethyl ketone, tetrahydrofuran, acetonitrile, acetone, ethanol, ethyl acetate, and water. These solvents may be used in combination. The amount of the solvent used is not particularly limited, and may be determined as appropriate in accordance with the manufacturing method and the material to be used.

As the negative electrode active material, any known negative electrode active material of batteries may be used as long as being capable of storing and discharging ions. Specifically, an alkali metal, a metal alloy such as an alkali metal-aluminum alloy, a graphite material such as an artificial graphite and a natural graphite, a mesophase calcined body made from coal or petroleum pitches, a carbon material such as non-graphitizable carbon, a Si-based negative electrode material such as Si, a Si alloy, and SiO, or a Sn-based negative electrode material such as a Sn alloy may be used.

The negative electrode may be manufactured in the same manner as for the positive electrode. In addition, the same conductive auxiliary agent, binder, and solvent for dispersing the material as in the positive electrode can be used in manufacturing the negative electrode.

The electrolyte composition according to the present invention may be, as a binder, mixed into a positive or negative electrode material slurry so as to be applied onto a substrate. Alternatively, a positive or negative electrode material slurry may be applied and dried on a substrate, on which an electrolyte solution containing the electrolyte composition according to the present invention may further be applied and dried.

As the electrolyte, any of a polymer solid electrolyte, an inorganic solid electrolyte, and a molten salt, for example, may be used in combination with the electrolyte composition according to the present invention. Among these, the electrolyte composition according to the present invention is used in one preferred embodiment.

<Battery>

The present invention is also directed to a battery including the electrolyte film and/or the electrode according to the present invention.

The battery according to the present invention includes, as a separator, the electrolyte film according to the present invention in one preferred embodiment. More specifically, the battery is a secondary battery including a positive electrode and a negative electrode. An electrolyte film is interposed between the positive and negative electrodes, and housed in an exterior case together with the positive and negative electrodes in one preferred embodiment.

The shape of the battery according to the present invention is not particularly limited. Any shape, such as a cylindrical, rectangular, laminated, or coin shape or a large size, typically known as a battery shape may be employed. In use as a high-voltage (e.g., tens to hundreds of volts) power supply to be mounted in an electric vehicle or a hybrid electric vehicle, for example, individual batteries may be connected in series into a battery module.

The battery is an alkali metal battery in one preferred embodiment. An alkali metal battery including the electrolyte film and/or the electrode according to the present invention is also one aspect of the present invention. The electrolyte film or the electrode containing the electrolyte composition according to the present invention is an electrolyte film or an electrode for an alkali metal battery in one preferred embodiment of the present invention.

The battery is a secondary battery in one preferred embodiment. The battery is a lithium ion secondary battery in one preferred embodiment of the present invention.

EXAMPLES

The present invention will be described in more detail below with reference to examples. The present invention is however not limited to only these examples. Note that, unless otherwise specified, "part(s)" refers to "parts by weight", "%" refers to "% by mass", and "Mw" refers to "weight-average molecular weight". In addition, "liter" may be simply referred to as "L", and "mol/liter" as "M".

<Synthesis Example 1> Synthesis of Cross-Linking Group-Containing Polyalkylene Oxide Copolymer A 1 L-capacity autoclave reactor equipped with a stirrer, an addition port, and a temperature sensor was replaced with nitrogen. Then, 286.5 parts of toluene subjected to dehydration treatment with a molecular sieve and 0.85 parts of t-butoxy potassium (i.e., 1.0 M tetrahydrofuran solution) were sequentially introduced and pressurized with nitrogen until the gauge pressure inside the reactor reached 0.3 MPa.

The internal temperature of the reactor was raised to 90° C. in an oil bath. Thereafter, ethylene oxide started being supplied at a rate of 0.85 parts/min. After 30 minutes from the start of supplying the ethylene oxide, a monomer mixture (e.g. at a weight ratio of butylene oxide/allyl glycidyl ether=8/3) started being supplied at a rate of 0.131 parts/min. After 2.5 hours from the start of supplying the ethylene oxide, the supply rates of the ethylene oxide and the monomer mixture were lowered to 0.43 parts/min and 0.053 parts/min, respectively, and quantitatively supplied for 5 hours (e.g., in total 255 parts of the ethylene oxide and in total 31.5 parts of the monomer mixture). During the supply, the reaction was performed at 100° C.±5° C. while monitoring and controlling the increases in the internal temperature and internal pressure caused by the polymerization heat. After the end of the supply, the mixture was further held at 100° C.±5° C. for 2 hours to age. After the end of the aging, the solvent was distilled off from the reaction mixture by devolatilization under reduced pressure. Thus, a cross-linking group-containing polyalkylene oxide copolymer (A) with a Mw of 104,000 was obtained.

<Synthesis Example 2> Synthesis of Polyethylene Oxide Polymer (B)

A 1 L-capacity autoclave reactor equipped with a stirrer, an addition port, and a temperature sensor was replaced with nitrogen. Then, 335.3 parts of toluene subjected to dehydration treatment with a molecular sieve and 1.61 parts of t-butoxy potassium (i.e., 1.0 M tetrahydrofuran solution) were sequentially introduced and pressurized with nitrogen until the gauge pressure inside the reactor reached 0.3 MPa.

The internal temperature of the reactor was raised to 95° C. in an oil bath. Thereafter, ethylene oxide started being supplied at a rate of 1.12 parts/min. The supply rates were adjusted as appropriate, while monitoring and controlling the increases in the internal temperature and pressure caused by the polymerization heat to continuously supply 223.6 parts of ethylene oxide at 100° C.±5° C. for 350 minutes. After the end of the supply, the mixture was further held at 100° C.±5° C. for 2 hours to age. After the end of the aging, the solvent was distilled off from the reaction mixture by devolatilization under reduced pressure. Thus, a polyethylene oxide polymer (B) with a Mw of 110,000 was obtained.

<Example 1-1> Preparation of Electrolyte Film (1)

1.4 g of lithium bis(fluorosulfonyl)imide (hereinafter, referred to as LiFSI) (manufactured by Nippon Shokubai Co., Ltd.) as an electrolyte salt, 0.46 g of a curable monomer (A) (manufactured by Shin-Nakamura Chemical Co, Ltd., chemical name: polyethylene glycol #600 diacrylate), 0.12 g of ethylene carbonate (Lithium Battery Grade (LBG) manufactured by Kishida Chemical Co., Ltd.), and 0.02 g of a polymerization initiator (ESACURE KTO46 (a mixture of 2,4,6-trimethylbenzoyldiphenylphosphine oxide, α-hydroxy ketone, and a benzophenone derivative) manufactured by DKSH Management Ltd.) were weighed in a PP vial (of 10 mL). A resultant mixture was heated and dissolved at 75° C. for 60 minutes using a constant temperature bath. Thus, a desired solution (i.e., an electrolyte solution) was obtained. The prepared electrolyte solution was applied onto a Teflon (registered trademark) sheet and then covered with another Teflon (registered trademark) sheet on upper surface, via a PET film with a thickness of 50 μm as a spacer. The resultant laminate was flattened by a parallel-plate press machine. Through the Teflon (registered trademark) sheet, each side was irradiated with UV light for 60 seconds using an ultra-high pressure mercury lamp (4.2 mW/cm$^2$ (365 nm) after transmitting through a Teflon (registered trademark) sheet) for a photopolymerization reaction, Thus, an electrolyte film with a film thickness of 48 μm was obtained.

<Example 1-2> Preparation of Electrolyte Film (2)

An electrolyte film with a film thickness of 44 μm was obtained in the same manner as in Example 1-1 except that components added (compounding ratio) were 1.3 g of LiFSI, 0.5 g of a curable monomer (A), 0.18 g of ethylene carbonate, and 0.02 g of a polymerization initiator.

<Example 1-3> Preparation of Electrolyte Film (3)

An electrolyte film with a film thickness of 50 μm was obtained in the same manner as in Example 1-1 except that components added were 1.3 g of LiFSI, 0.54 g of a curable monomer (C) (manufactured by Shin-Nakamura Chemical Co, Ltd., chemical name: polyethylene glycol #1000 diacrylate), 0.14 g of ethylene carbonate, and 0.02 g of a polymerization initiator.

<Example 1-4> Preparation of Electrolyte Film (4)

An electrolyte film with a film thickness of 42 μm was obtained in the same manner as in Example 1-1 except that components added were 1.3 g of LiFSI, 0.38 g of a curable monomer (A), 0.12 g of a curable monomer (B) (manufactured by Shin-Nakamura Chemical Co, Ltd., chemical name: methoxypolyethylene glycol #600 acrylate), 0.18 g of ethylene carbonate, and 0.02 g of a polymerization initiator.

<Example 1-5> Preparation of Electrolyte Film (5)

An electrolyte film with a film thickness of 45 μm was obtained in the same manner as in Example 1-1 except that components added were 1.3 g of LiFSI, 0.5 g of a curable monomer (A), and 0.18 g of succinonitrile.

<Example 1-6> Preparation of Electrolyte Film (6)

An electrolyte film with a film thickness of 51 μm was obtained in the same manner as in Example 1-1 except that components added were 1.2 g of LiFSI, 0.6 g of a curable monomer (A), 0.18 g of ethylene carbonate, and 0.02 g of a polymerization initiator.

<Example 1-7> Preparation of Electrolyte Film (7)

An electrolyte film with a film thickness of 45 μm was obtained in the same manner as in Example 1-1 except that components added were 1.2 g of LiFSI, 0.5 g of a curable monomer (A), 0.28 g of ethylene carbonate, and 0.02 g of a polymerization initiator.

<Example 1-8> Preparation of Electrolyte Film (8)

An electrolyte film with a film thickness of 49 μm was obtained in the same manner as in Example 1-1 except that components added were 1.1 g of LiFSI, 0.6 g of a curable monomer (A), 0.28 g of ethylene carbonate, and 0.02 g of a polymerization initiator.

<Example 1-9> Preparation of Electrolyte Film (9)

An electrolyte film with a film thickness of 56 μm was obtained in the same manner as in Example 1-1 except that components added were 1.0 g of LiFSI, 0.7 g of a curable monomer (A), 0.28 g of ethylene carbonate, and 0.02 g of a polymerization initiator.

<Example 1-10> Preparation of Electrolyte Film (10)

An electrolyte film with a film thickness of 32 μm was obtained in the same manner as in Example 1-1 except that components added were 1.3 g of LiFSI, 0.5 g of a curable monomer (C) (manufactured by Shin-Nakamura Chemical Co, Ltd., chemical name: polyethylene glycol #1000 diacrylate), 0.18 g of ethylene carbonate, and 0.02 g of a polymerization initiator.

<Example 1-11> Preparation of Electrolyte Film (11)

An electrolyte film with a film thickness of 37 μm was obtained in the same manner as in Example 1-1 except that components added were 1.3 g of LiFSI, 0.44 g of a curable monomer (C) (manufactured by Shin-Nakamura Chemical Co, Ltd., chemical name: polyethylene glycol #1000 diacrylate), 0.24 g of ethylene carbonate, and 0.02 g of a polymerization initiator.

<Example 1-12> Preparation of Electrolyte Film (12)

An electrolyte film with a film thickness of 58 μm was obtained in the same manner as in Example 1-1 except that components added were 1.2 g of LiFSI, 0.12 g of acetonitrile (Lithium Battery Grade (LBG) manufactured by Kishida Chemical Co., Ltd.) (solvent A), 0.44 g of a curable monomer (A), 0.22 g of ethylene carbonate, and 0.02 g of a polymerization initiator.

<Example 1-13> Preparation of Electrolyte Film (13)

An electrolyte film with a film thickness of 56 μm was obtained in the same manner as in Example 1-1 except that components added were 1.3 g of LiFSI, 0.12 g of acetonitrile (Lithium Battery Grade (LBG) manufactured by Kishida Chemical Co., Ltd.) (solvent A), 0.32 g of a curable monomer (A), 0.24 g of ethylene carbonate, and 0.02 g of a polymerization initiator.

<Example 1-14> Preparation of Electrolyte Film (14)

An electrolyte film with a film thickness of 52 μm was obtained in the same manner as in Example 1-1 except components added were 1.3 g of LiFSI, 0.4 g of a curable monomer (B), 0.28 g of dimethyl sulfone (Special Grade Reagent manufactured by FUJIFILM Wako Pure Chemical Corporation), and 0.02 g of a polymerization initiator.

<Example 1-15> Preparation of Electrolyte Film (15)

An electrolyte film with a film thickness of 52 μm was obtained in the same manner as in Example 1-1 except that components added were 1.3 g of LiFSI, 0.4 g of a curable monomer (B), 0.4 g of a curable monomer (D) (manufactured by Shin-Nakamura Chemical Co, Ltd., product name: UA-7100, urethane acrylate), 0.14 g of dimethyl sulfone, and 0.02 g of a polymerization initiator.

<Example 1-16> Preparation of Electrolyte Film (16)

An electrolyte film with a film thickness of 55 μm was obtained in the same manner as in Example 1-1 except that components added were 1.2 g of LiTFSI (Lithium Battery Grade (LBG) manufactured by Kishida Chemical Co., Ltd.), 0.46 g of a curable monomer (B), 0.32 g of dimethyl sulfone, and 0.02 g of a polymerization initiator.

<Example 1-17> Preparation of Electrolyte Film (17)

An electrolyte film with a film thickness of 55 μm was obtained in the same manner as in Example 1-1 except that components added were 1.3 g of LiTFSI, 0.2 g of a curable monomer (B), 0.2 g of a curable monomer (D), 0.28 g of dimethyl sulfone, and 0.02 g of a polymerization initiator.

<Example 1-18> Preparation of Electrolyte Film (18)

An electrolyte film with a film thickness of 60 μm was obtained in the same manner as in Example 1-1 except that components added were 1.1 g of LiFSI, 0.2 g of LiTFSI, 0.2 g of a curable monomer (B), 0.2 g of a curable monomer (D), 0.28 g of dimethyl sulfone, and 0.02 g of a polymerization initiator.

<Comparative Example 1-1> Preparation of Comparative Electrolyte Film (1)

0.2 g of LiTFSI, 0.79 g of a polymer (A), and 0.01 g of a polymerization initiator were weighed in a PP vial (of 10 mL). Then, 1.6 g of acetonitrile (Lithium Battery Grade (LBG) manufactured by Kishida Chemical Co., Ltd.) was further added to mix and dissolve the components. Thus, an electrolyte solution was obtained. The prepared electrolyte solution was applied onto a Teflon (registered trademark) sheet, and then heated and dried at 40° C. for 30 minutes using a hot air drier, and further vacuum-dried at a vacuum absolute pressure of −0.1 MPa and 40° C. for 24 hours using a vacuum dryer to remove the solvent. Another Teflon (registered trademark) sheet was then overlaid onto the upper surface of the dried film, each side was irradiated with UV light for 60 seconds using an ultra-high pressure mercury lamp (4.2 mW/cm$^2$ (365 nm) after transmitting through a Teflon (registered trademark) sheet) for a photopolymerization reaction. Thus, an electrolyte film with a film thickness of 28 μm was obtained.

<Comparative Example 1-2> Preparation of Comparative Electrolyte Film (2)

An electrolyte film with a film thickness of 30 μm was obtained in the same manner as in Comparative Example 1-1 except that components added were 0.12 g of LiFSI, 0.87 g of a polymer (A), and 0.01 g of a polymerization initiator.

<Comparative Example 1-3> Preparation of Comparative Electrolyte Film (3)

An electrolyte film with a film thickness of 50 μm was obtained in the same manner as in Example 1-1 except that components added were 1.3 g of LiFSI, 0.68 g of a curable monomer (A), and 0.02 g of a polymerization initiator.

Table 1 shows the respective amounts of the components used in Examples 1-1 to 1-11 and Comparative Examples 1-1 to 1-3. Table 2 shows the amounts of the components used in Examples 1-12 to 1-18.

<Measurement of Ion Conductivity and Lithium Transport Number>

In order to measure the ion conductivity and lithium transport number, a potentiogalvanostat (VSP-300 manufactured by Biologic) was used. Each of the electrolyte films prepared in Examples 1-1 to 1-11 and Comparative Examples 1-1 to 1-3 was punched out with a punch of ø12 mm, and interposed between two sheets of lithium foil (with a thickness of 0.2 mm manufactured by Honjo Metal Co., Ltd.) of ø10 mm into a laminate. The laminate was further interposed between two SUS316L-made spacers (with a thickness of 0.5 mm and ø15.5 mm manufactured by Hohsen Corp.) and fixed to a jig of measuring equipment. Under the environment of a temperature of 40° C., conduction treatment of a current Is of +0.0785 mA (0.1 mA/cm$^2$) for one minute and a current Is of −0.0785 mA for one minute was repeated a total of five times. Using the same equipment, impedance analysis was performed at 1 MHz to 10 mHz and an amplitude of 10 mV. $R_b$ is a bulk resistance component obtained in the Cole-Cole plot, whereas $R_{Si}$ (Ω) is an interface resistance component between the lithium foil and the electrolyte film. Next, a voltage of 20 mV was applied for 5 minutes for application test. $I_i$ (A) and $I_c$ (A) are the respective current values immediately after the voltage application and after five minutes. With the voltage of 20 mV applied, the impedance analysis was performed at 1 MHz to 10 mHz and an amplitude of 10 mV. $R_{Sc}$ (Ω) is an

TABLE 1

| | Lithium Salt | | Polymer | Curable Monomer (A) | | | Salt Dissociating Agent | | Polymerization |
|---|---|---|---|---|---|---|---|---|---|
| | LiFSI | LiTFSI | (A) | Monomer (A) | Monomer (B) | Monomer (C) | Ethylene Carbonate | Succinonitrile | Initiator |
| Example 1-1 | 70 | — | — | 23 | — | — | 6 | — | 1 |
| Example 1-2 | 65 | — | — | 25 | — | — | 9 | — | 1 |
| Example 1-3 | 65 | — | — | — | — | 27 | 7 | — | 1 |
| Example 1-4 | 65 | — | — | 19 | 6 | — | 9 | — | 1 |
| Example 1-5 | 65 | — | — | 25 | — | — | — | 9 | 1 |
| Example 1-6 | 60 | — | — | 30 | — | — | 9 | — | 1 |
| Example 1-7 | 60 | — | — | 25 | — | — | 14 | — | 1 |
| Example 1-8 | 55 | — | — | 30 | — | — | 14 | — | 1 |
| Example 1-9 | 50 | — | — | 35 | — | — | 14 | — | 1 |
| Example 1-10 | 65 | — | — | — | — | 25 | 9 | — | 1 |
| Example 1-11 | 65 | — | — | — | — | 22 | 12 | — | 1 |
| Comparative Example 1-1 | — | 20 | 79 | — | — | — | — | — | 1 |
| Comparative Example 1-2 | 12 | — | 87 | — | — | — | — | — | 1 |
| Comparative Example 1-3 | 65 | — | — | 34 | — | — | — | — | 1 |

Unit: mass %

TABLE 2

| | Lithium Salt | | Solvent | Curable Monomer (A) | | | Salt Dissociating Agent | | Polymerization |
|---|---|---|---|---|---|---|---|---|---|
| | LiFSI | LiTFSI | (A) | Monomer (A) | Monomer (B) | Monomer (D) | Ethylene Carbonate | Dimethyl Sulfone | Initiator |
| Example 1-12 | 60 | — | 6 | 22 | — | — | 11 | — | 1 |
| Example 1-13 | 65 | — | 6 | 16 | — | — | 12 | — | 1 |
| Example 1-14 | 65 | — | — | — | 20 | — | — | 14 | 1 |
| Example 1-15 | 65 | — | — | — | 10 | 10 | — | 14 | 1 |
| Example 1-16 | — | 60 | — | 23 | — | — | — | 16 | 1 |
| Example 1-17 | — | 65 | — | — | 10 | 10 | — | 14 | 1 |
| Example 1-18 | 55 | 10 | — | — | 10 | 10 | — | 14 | 1 |

Unit: mass % interface resistance component between the lithium foil and the electrolyte film obtained in the Cole-Cole plot. The ion conductivity α (S/cm) is calculated in accordance with the following equation (α), where T (cm) is a thickness of a sample to be measured, and an area A (cm²) of the sample is the area of the portion of the electrolyte film in contact with the lithium foil.

$$\sigma = T/AR_b \quad (\alpha)$$

The lithium transport number is calculated in accordance with the following equation (β), where E (V) is an applied voltage.

$$tLi = I_c(E - R_{Si}I_i)/I_i(E - R_{Sc}I_c) \quad (3)$$

Table 3 shows the results.

<Evaluation on Lithium Ion Conductivity (Conduction Load Test)>

Next, a conduction test was performed by applying a current I at ±0.157 mA (±0.2 mA/cm²) for 3 minutes each, ±0.236 mA (±0.3 mA/cm²) for 3 minutes each, ±0.314 mA (±0.4 mA/cm²) for 3 minutes each, ±0.393 mA (±0.5 mA/cm²) for 3 minutes each, and ±0.471 mA (±0.6 mA/cm²) for 3 minutes each. Then, the applied current value was continuously increased in increments of 0.2 mA/cm². With the increase in the current value, the load applied to the electrolyte film increases. Thus, at a certain current value or more, the film cannot conduct lithium ions and the electromotive force reaches 1.5 V in the electrical conduction. The ease of the flow of lithium ions was determined from the current value at the time of reaching 1.5 V in the continuous current conduction for 3 minutes. Table 3 shows the results.

TABLE 3

|  | Ion Conductivity (S/cm) | Lithium Transport Number | Current at Time of Reaching 1.5 V (mA/cm²) |
| --- | --- | --- | --- |
| Example 1-1 | $7.6 \times 10^{-6}$ | 0.72 | 1.4 |
| Example 1-2 | $8.7 \times 10^{-6}$ | 0.69 | 1.4 |
| Example 1-3 | $1.8 \times 10^{-5}$ | 0.58 | 1.8 |
| Example 1-4 | $1.2 \times 10^{-5}$ | 0.64 | 1.4 |
| Example 1-5 | $8.8 \times 10^{-6}$ | 0.68 | 1.4 |
| Example 1-6 | $6.1 \times 10^{-6}$ | 0.66 | 1.2 |
| Example 1-7 | $1.0 \times 10^{-5}$ | 0.56 | 1.0 |
| Example 1-8 | $7.8 \times 10^{-6}$ | 0.51 | 1.0 |
| Example 1-9 | $6.2 \times 10^{-6}$ | 0.48 | 0.8 |
| Example 1-10 | $1.9 \times 10^{-5}$ | 0.56 | 1.8 |
| Example 1-11 | $2.3 \times 10^{-5}$ | 0.55 | 1.8 |
| Example 1-12 | $3.3 \times 10^{-5}$ | 0.51 | 1.8 |
| Example 1-13 | $5.9 \times 10^{-5}$ | 0.52 | 2.0 |
| Example 1-14 | $2.7 \times 10^{-5}$ | 0.64 | 2.0 |
| Example 1-15 | $2.8 \times 10^{-5}$ | 0.68 | 2.0 |
| Example 1-16 | $9.2 \times 10^{-6}$ | 0.59 | 1.4 |
| Example 1-17 | $1.4 \times 10^{-5}$ | 0.63 | 1.6 |
| Example 1-18 | $2.4 \times 10^{-5}$ | 0.65 | 1.8 |
| Comparative Example 1-1 | $5.0 \times 10^{-5}$ | 0.09 | 0.5 |
| Comparative Example 1-2 | $4.9 \times 10^{-5}$ | 0.10 | 0.5 |
| Comparative Example 1-3 | $6.7 \times 10^{-7}$ | —(*) | 0.3 |

(*)Too high and uncalculatable.

The results of Table 3 showed that the electrolyte films obtained in Examples 1-1 to 1-18 of the present invention exhibited lower ion conductivities than in Comparative Examples 1-1 to 1-2 but greater lithium transport numbers. These results demonstrated that the electrolyte films exhibited excellent ion conductivities in the conduction load test. In addition, these results demonstrated that an excellent ion conductivity was achieved by adding the salt dissociating agent, as compared with the results of Comparative Example 1-3.

<Example 2-1> Preparation of Lithium Ion Secondary Battery (1)

100 parts of $LiNi_{1/3}Co_{1/3}Mn_{1/3}O_2$ (manufactured by Umicore) as a positive electrode active material, 3 parts of acetylene black (a powdery product, manufactured by Denka Company Limited.) as a conductive auxiliary agent, 3 parts of graphite powder (J-SP manufactured by Nippon Graphite Industries, Co., Ltd.), and 3 parts of polyvinylidene fluoride (#7200 manufactured by KUREHA CORPORATION) as a binder were dispersed in N-methylpyrrolidone (Lithium Battery Grade (LBG) manufactured by Kishida Chemical Co., Ltd.) to obtain a positive electrode mixture slurry. The positive electrode mixture slurry was uniformly applied onto aluminum foil (grade 1085) as a positive electrode current collector, and then heated and dried at 70° C. for 30 minutes using a hot air drier, and further vacuum-dried at a vacuum absolute pressure of −0.1 MPa and 110° C. for 2 hours using a vacuum dryer to remove the solvent. Thus, a positive electrode sheet with a positive electrode weight of 9.8 mg/cm² and a film thickness of 35 μm (except for aluminum foil) was obtained.

The electrolyte solution prepared in Example 1-3 was applied onto the positive electrode sheet. The upper surface thereof was covered with a Teflon (registered trademark) sheet, via a PET film with a thickness of 50 μm as a spacer. The resultant laminate was flattened by a parallel-plate press machine. Through the Teflon (registered trademark) sheet, the positive electrode sheet was irradiated with UV light for 60 seconds using an ultra-high pressure mercury lamp (4.2 mW/cm² (365 nm) after transmitting through a Teflon (registered trademark) sheet) to perform a photopolymerization reaction. Thus, an electrolyte film-integrated positive electrode having an applied electrolyte layer with a thickness of 63 μm (except for the thickness of the positive electrode active material layer) was prepared.

The resultant electrolyte film-integrated positive electrode punched out into ø14 mm as a positive electrode of a battery and lithium foil with a thickness of 0.5 mm punched out into ø15 mm as a negative electrode were stacked with the lithium foil opposed to the electrolyte surface. A positive electrode case that is a CR2032 coin cell member (manufactured by Hohsen Corp.), a negative electrode cap, a SUS-made spacer with a thickness of 1.0 mm, a wave washer, and a gasket were crimped by an automatic coin cell crimper (manufactured by Hohsen Corp.) to prepare a coin cell lithium ion secondary battery.

<Example 2-2> Preparation of Lithium Ion Secondary Battery (2)

An integrated positive electrode with a thickness of 71 μm (except for the thickness of the positive electrode active material layer) was prepared in the same manner as in Example 2-1 except that the electrolyte solution prepared in Example 1-4 was applied onto the positive electrode sheet. A lithium ion secondary battery was then prepared using the integrated positive electrode.

<Comparative Example 2-1> Preparation of Comparative Lithium Ion Secondary Battery (1)

0.2 g of LiTFSI, 0.8 g of polymer (B), and 1.6 mL of acetonitrile were mixed and dissolved to obtain an electrolyte solution. The electrolyte solution was uniformly applied onto a positive electrode sheet prepared as in Example 2-1, and then heated and dried at 40° C. for 30 minutes using a hot air drier, and further vacuum-dried at a vacuum absolute pressure of −0.1 MPa and 70° C. for 2 hours using a vacuum dryer to remove the solvent. Thus, a composite positive electrode sheet impregnating lithium salt and polymer was obtained.

The resultant composite positive electrode sheet was punched out into ø14 mm as a positive electrode of a battery. The electrolyte film prepared in Comparative Example 1-1 was punched out into ø16 mm as an electrolyte film. Lithium foil with a thickness of 0.5 mm was punched into ø15 mm as a negative electrode. These were stacked in the order of the lithium foil, the electrolyte film, and the positive electrode, with the lithium foil opposed to the electrolyte-applied surface of the positive electrode. A positive electrode case that is a CR2032 coin cell member (manufactured by Hohsen Corp.), a negative electrode cap, a SUS-made spacer with a thickness of 1.0 mm, a wave washer, and a gasket were crimped by an automatic coin cell crimper (manufactured by Hohsen Corp.) to prepare a coin cell lithium ion secondary battery.

<Evaluation on Lithium Ion Secondary Battery>

The charge and discharge of the coin-type lithium ion secondary batteries prepared in Examples 2-1 and 2-2 and Comparative Example 2-1 were tested using charge/discharge test equipment (ACD-01 manufactured by Aska Electronic Co., Ltd.). Under the environment of a temperature of 40° C., the batteries were charged to 4.2 V under a charge condition C/24 (where 1C is a current value fully charged in 1 hour at a positive electrode capacity of 150 mAh/g). Then, the batteries paused for 15 minutes, and discharged to 2.5 V under the discharge condition C/24. Next, the batteries were charged to 4.2 V under the charge condition C/24 and then paused for 15 minutes. The batteries were discharged to 2.5 V under a charge condition C/6. The discharge curves and the discharge capacities were obtained at this time. FIG. 1 shows the obtained discharge curves.

FIG. 1 showed that the lithium ion secondary batteries (in Examples 2-1 and 2-2) using the electrolyte film obtained from the electrolyte composition according to the present invention had higher discharge voltages and discharge capacities than in Comparative Example 2-1.

The invention claimed is:

1. An electrolyte composition containing an alkali metal salt, the composition further comprising:
   a photocurable and/or thermosetting monomer; and
   a salt dissociating agent,
   (A) a content ratio of the alkali metal salt being 50% by mass to 88% by mass relative to 100% by mass of a total amount of the alkali metal salt, the photocurable and/or thermosetting monomer, and the salt dissociating agent;
   (B) a content of the photocurable and/or thermosetting monomer being 10% by mass to 45% by mass relative to 100% by mass of the total amount of the alkali metal salt, the photocurable and/or thermosetting monomer, and the salt dissociating agent; and
   (C) a content of the salt dissociating agent being 0.5% by mass to 30% by mass relative to 100% by mass of the total amount of the alkali metal salt, the photocurable and/or thermosetting monomer, and the salt dissociating agent.

2. The electrolyte composition of claim 1, wherein the alkali metal salt is represented by the following formula (1):

$$MN(SO_2R^1)(SO_2R^2) \tag{1}$$

(where M represents the alkali metal ion, and $R^1$ and $R^2$ are identical to or different from each other and each represent a fluorine atom or a fluoroalkyl group with a carbon number of 1 to 3).

3. The electrolyte composition of claim 1, wherein the alkali metal salt is an alkali metal salt of bis(fluorosulfonyl)imide.

4. The electrolyte composition of claim 1, wherein the photocurable and/or thermosetting monomer has a hetero element.

5. The electrolyte composition of claim 1, wherein the photocurable and/or thermosetting monomer contains a polyfunctional monomer.

6. The electrolyte composition of claim 1, wherein the salt dissociating agent is a carbonate compound.

7. The electrolyte composition of claim 1, wherein the salt dissociating agent is a sulfonyl compound.

8. The electrolyte composition of claim 1, wherein the salt dissociating agent is a nitrile compound.

9. The electrolyte composition of claim 1, further comprising:
   a polymerization initiator.

10. An electrolyte film obtained by curing the electrolyte composition of claim 1, the electrolyte film comprising:
    an alkali metal salt;
    a polymer having a structural unit derived from a photocurable and/or thermosetting monomer; and
    a salt dissociating agent.

11. The electrolyte film of claim 10, further comprising:
    an organic solvent with a lower boiling point than the salt dissociating agent,
    a content of the organic solvent being 20% by mass or less relative to 100% by mass of a total amount of the alkali metal salt, the polymer having the structural unit derived from the photocurable and/or thermosetting monomer, and the salt dissociating agent.

12. A method of manufacturing an electrolyte film, comprising:
    a step of curing the electrolyte composition of claim 1, wherein
    an amount of the organic solvent with a lower boiling point than the salt dissociating agent used in the step of curing is 20% by mass or less relative to 100% by mass of the total amount of the alkali metal salt, the photocurable and/or thermosetting monomer, and the salt dissociating agent in the composition.

13. The electrolyte composition of claim 1, further comprising:
    (D) the photocurable and/or thermosetting monomer contains a monomer having a structural unit derived from alkylene oxide.

14. The electrolyte composition of claim 1, further comprising:
    (E) the content of the monomer having a structural unit derived from alkylene oxide being 30% by mass to 100% by mass relative to 100% by mass of the total amount of the photocurable and/or thermosetting monomer.

* * * * *